ANALOG COMPUTER APPARATUS FOR REPETITIVE TYPE OPERATION

Filed Oct. 19, 1964 3 Sheets-Sheet 1

INVENTORS
LAURENCE E. FOGARTY
ROBERT M. HOWE
BY
ATTORNEY

Feb. 20, 1968 L. E. FOGARTY ET AL 3,370,159

ANALOG COMPUTER APPARATUS FOR REPETITIVE TYPE OPERATION

Filed Oct. 19, 1964 3 Sheets-Sheet 2

INVENTORS
LAURENCE E. FOGARTY
ROBERT M. HOWE
BY [signature]
ATTORNEY

INVENTORS
LAURENCE E. FOGARTY
ROBERT M. HOWE
BY [signature]
ATTORNEY

United States Patent Office 3,370,159
Patented Feb. 20, 1968

3,370,159
ANALOG COMPUTER APPARATUS FOR REPETITIVE TYPE OPERATION

Laurence E. Fogarty and Robert M. Howe, Ann Arbor, Mich., assignors to Applied Dynamics, Inc., Ann Arbor, Mich., a corporation of Michigan Filed Oct. 19, 1964, Ser. No. 404,895
17 Claims. (Cl. 235—184)

ABSTRACT OF THE DISCLOSURE

Analog or hybrid analog-digital computer apparatus in which overload signals are derived from the plural-stage direct-coupled high-frequency channels of dual channel operational amplifiers to provide rapid sensing of operational amplifier overload, and use of such overload signals to control integrator modes, integrator time-constants, repetitive operation cycles and application of signals between analog computer apparatus and an attached digital computer.

In the analog computer art is frequently is desirable to arrange a computer so that it will run through the solution of a problem over and over again, often in order that one or more computed quantities may be displayed, as on the face of an oscilloscope. By watching the variations in the displayed quantities as various other computer input quantities are adjusted, a better understanding may be obtained of the problem being solved or the process being simulated, and frequently optimum solutions may be found. The usual method of accomplishing such repetitive computer operation in the prior art has involved the use of a clock or timing device which generates electrical signal pulses at predetermined regular intervals, with such timing pulses being used to control relays or switches to control the modes of operation of the computer. For example, a first timing pulse has activated the "initial condition" mode of the computer, causing all of the integrators of the computer to be charged to a given set of initial condition voltages, and then a second timing pulse, or more commonly, the reset of the mentioned first pulse, initiates the computer "operate" mode, causing the computer to run through the problem for a predetermined length of time, until the occurrence of the next timing pulse again resets the computer to the "initial condition" mode, starting the same cycle over again.

Many problems desirably solved in analog computers are sufficiently complex that the limits which various computer quantities will reach during a problem solution are difficult or impossible to predict prior to solution of the problem on the computer, with the result that selection of proper scale factors for various quantities frequently has had to be done by trial and error. If large scale factors are used, in a deliberate attempt to keep all or many computer voltages small, computer accuracy is impaired, while on the other hand, the use of small scale factors, which allows each computer quantity to vary over a greater voltage range, may result in one or more computer circuits being overloaded, so that they either cease computing or else compute grossly incorrectly. When various complex problems have been set up for repetitive solution under timing pulse control in accordance with the prior art, it frequently has been extremely difficult, if not impossible, to determine which quantities need re-scaling in order to avoid overloading. The overloading of one circuit may immediately introduce such non-linearities or errors into the computer that a number of additional circuits also become overloaded within a matter of milliseconds, and it becomes impossible to determine which circuit or circuits overloaded first in order that they may be re-scaled. Overload indicating lamps (and audible signals) have commonly been utilized in the prior art to warn the operator that an overload has occurred. If a number of such lights are illuminated substantially simultaneously, it frequently has been impossible for the operator to determine which lamp was illuminated first. It should be noted that some large-scale analog computers utilize several hundred operational amplifiers.

Using prior art repetitive operation control with computation cycles of a fixed length determined by the clock rate, the computer attempts to continue computing for the remainder of a computation cycle even if a circuit becomes overloaded early during the computation cycle, not only driving additional circuits into overload conditions, but also allowing the initially overloaded circuit to be overloaded even further, to a point where long recovery times may be required before the computer is capable of proper and accurate operation.

In accordance with one embodiment of the present invention, control of repetitive computation is not accomplished solely by timing pulses furnished at regular intervals, but also by pulse signals signifying that an overload has occurred somewhere in the computer. Each amplifier of the computer is connected to a pulse circuit, so that the occurrence of an overload in any amplifier will substantially immediately operate the pulse circuit, providing a pulse which immediately actuates the computer "initial condition" circuits, thereby preventing both the overloading of further amplifiers and the driving of the overloaded amplifier into a more heavily overloaded condition. The output pulse of the pulse circuit may be provided with a length which is several times as long as the time constant of the initial condition circuitry, insuring that all circuits will be set to their initial conditions prior to the end of the pulse, and upon occurrence of the end of the pulse, that edge may be used to actuate the "operate" circuitry of the computer, thereby beginning a new computation cycle. During the new computation cycle, and successive computation cycles, the same amplifier will overload, of course, at the same point in the problem solution, until that amplifier circuit is re-scaled, but during the many computation cycles which may occur before re-scaling is accomplished (as by adjustment of a potentiometer knob), the amplifier will not be heavily overloaded, and additional amplifiers will not be overloaded.

As the scaling of the circuit of the overloading amplifier is adjusted in the proper direction, the computer will progress further through the solution of the problem during each computer run, and after sufficient adjustment the computer will progress entirely through the desired range of solution of the problem. In one form of the invention the computer then may be re-cycled by sensing the occurrence of a selected event, such as a particular computer quantity (or quantities) reaching one (or more) specified values, thereby providing a signal to the "initial condition" circuits. In another form of the invention the computer may be re-cycled by occurrence of a clock pulse, and in a further form of the invention, the computer may be re-cycled by sensing the occurrence of either an overload *or* the termination of a clock pulse period, or by sensing the occurrence of either an overload *or* the termination of a clock pulse period, or by sensing the occurrence of either an overload *or* the occurrence of a selected event.

While the invention finds particular utility in connection with repetitive computation, it is also highly desirable in ordinary single-run problems that amplifiers not overload. Again, if a single amplifier overloads, it frequently will drive other amplifiers into overload conditions so quickly that one cannot readily discern which amplifier to re-scale. In accordance with the present invention, the occurrence of an overload condition on any computer amplifier may be utilized to switch the computer immediately to a "hold" mode, wherein all integrators are caused to stop integrating and caused to hold the signal values to which they have integrated at the time of the overload. Thus it is a further object of the invention to provide improved analog computer apparatus which is capable of automatically switching to its "hold" mode with great rapidity upon the occurrence of an overload in any of its operational amplifier circuits.

In a number of extremely complex applications, both analog and digital computers are utilized, with the results of an analog solution being used to control the program steps of the digital computer and with the digital computer also controlling the analog computer. If one or more operational amplifier circuits of the analog computer overload and feed grossly incorrect signals to the digital computer, the digital computation may be grossly incorrect, resulting in even more error in the analog computer, so that both computers tend to "run wild." The extreme complexity of the problem frequently defies analysis, so that the necessary re-adjustment of the analog computer may be extremely tedious and time-consuming.

In prior art general purpose analog computers, operational amplifier overload conditions usually have been sensed by noting the magnitude of the output signals emanating from stabilizer amplifier channels. Because such channels are provided principally for long-term drift correction, or zero and very low frequency response, such channels conventionally utilize long time-constant filters in their output circuits, and the overload signals derived from such channels are necessarily slowly-varying. Thus when an operational amplifier of the prior art has overloaded, a time period of the order of perhaps 30 milliseconds or more may pass before the associated overload indicating lamp will light and before any audible overload signal will occur. Time delays of this magnitude are unnoticeable to a human operator who observes such lamps or hears such audible signals. However, during such time periods, further amplifiers may be driven into overload conditions. In order that computer mode control be done in response to overloads in accordance with the present invention, it is necessary that the occurrence of an overload condition be sensed and caused to operate control circuits with a time delay which is less by orders of magnitude, preferably in time periods of the order of 10 or 20 microseconds or even less. Thus it is a further object of the present invention to provide computer apparatus including overload sensing means which derive overload signals much more rapidly than the overload indicating signals of the prior art.

Other objects of the invention will in part be obvious and will in part appear hereinafter.

The invention accordingly comprises the features of construction, combinations of elements, and arrangement of parts, which will be exemplified in the constructions hereinafter set forth, and the scope of the invention will be indicated in the claims.

For a fuller understanding of the nature and objects of the invention reference should be had to the following detailed description taken in connection with the accompanying drawings, in which:

FIG. 1 is an electrical schematic diagram largely in block form, illustrating an automatic "hold on overload" analog computer arrangement constructed in accordance with the present invention.

FIG. 1*a* is a schematic diagram illustrating a form of the invention in which occurrence of an overload automatically changes an integrator circuit time-constant.

Figure 1:
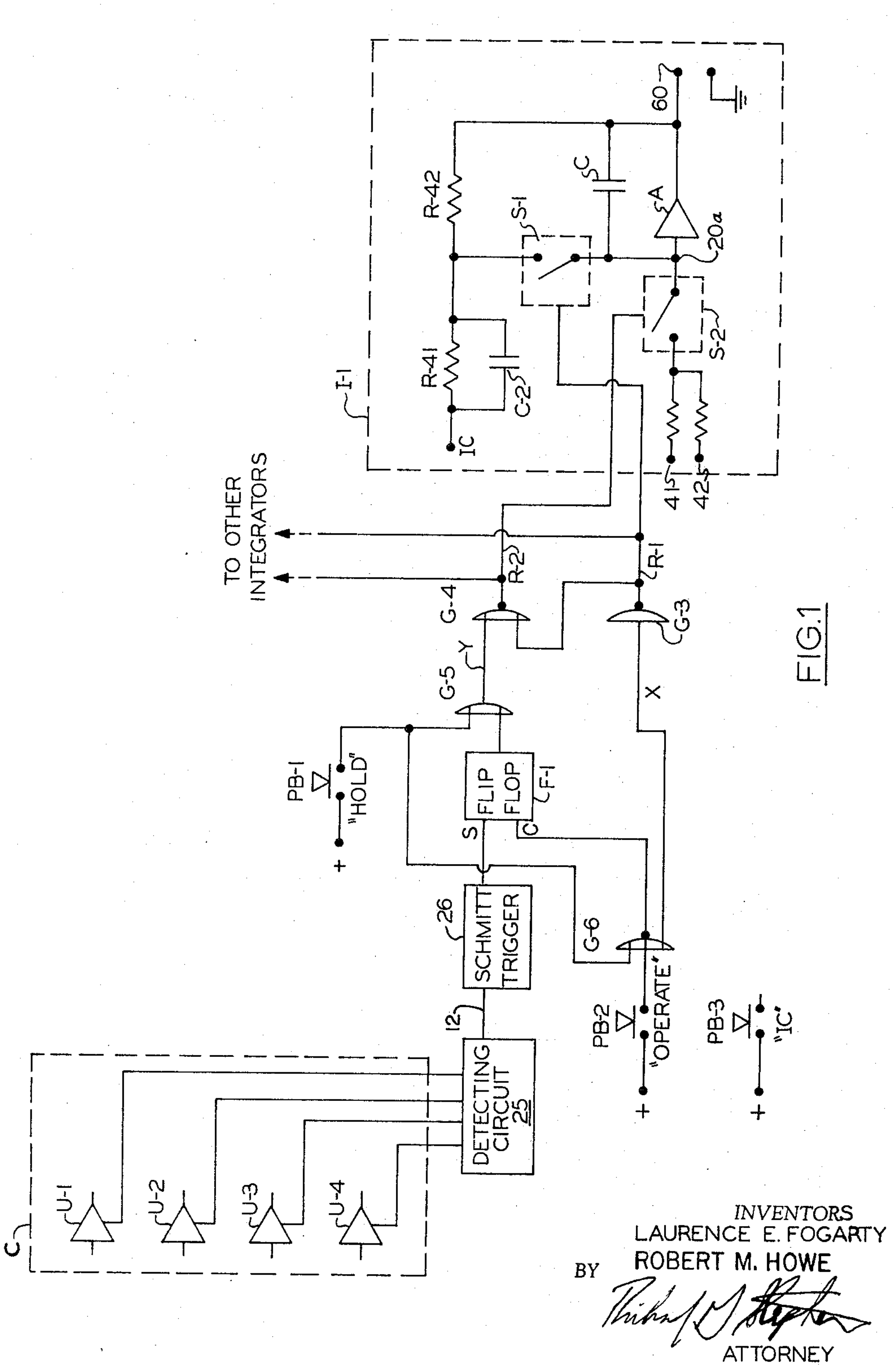

In the "automatic hold on overload" computer arrangement shown in FIG. 1 a plurality of amplifiers U–1 to U–4 shown within dashed lines at C are intended to represent the many operational amplifiers provided in a general purpose electronic analog computer, and many computers contain many dozen, and often several hundred such amplifiers. To solve a usual analog computer problem the input and output circuits of such amplifiers are inter-connected into an extremely complex network with potentiometers, scaling resistors, integrating capacitors, electronic multipliers, function generators and various other devices, none of which are shown in FIG. 1. The nature of the interconnection between the various elements is dictated by the specific equations which the computer is to solve, and to allow a general purpose computer to be connected to solve a wide variety of problems the terminals of such elements commonly are routed to one or more patchboards.

Figure 2:
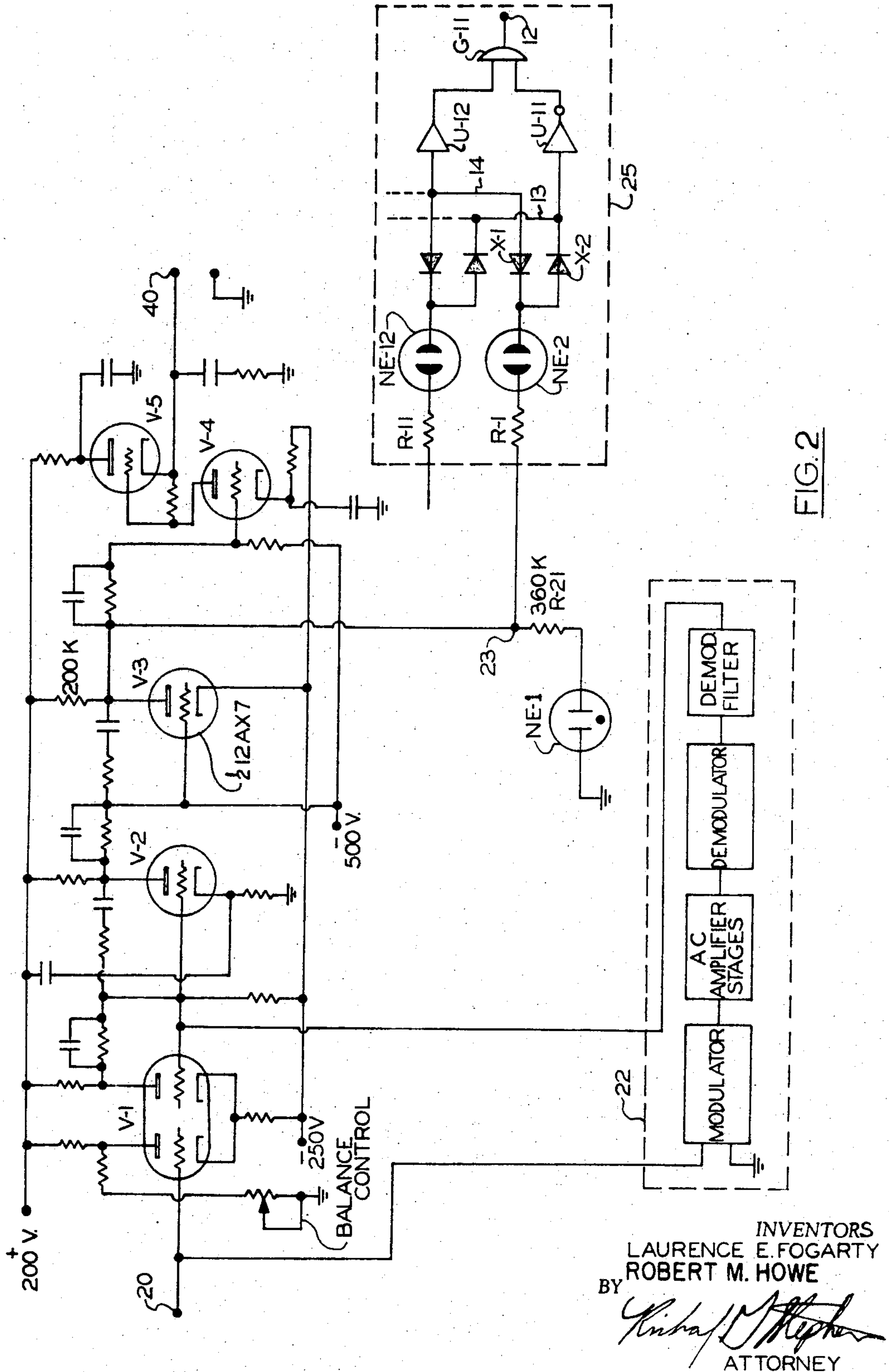
FIG. 2 is an electronic schematic diagram of a known form of dual-channel operational amplifier, with the amplifier overload signal shown derived from the amplifier in accordance with the present invention.

In accordance with the present invention, an overload signal derived in a manner described below in detail in connection with FIG. 2 is taken from each amplifier. The overload signal from each individual amplifier is routed to a detecting circuit 25, portions of which are shown in detail in FIG. 2. As will be explained below in connection with FIG. 2, the occurrence of an overload in any one of the computing amplifiers will result, substantially immediately, in an overload signal on line 12, the output line from detecting circuit 25.

Except for the manner in which the overload signal is derived, the dual channel amplifier apparatus of FIG. 2 is well-known in the art. The main amplifier channel comprises tubes V–1 through V–5, and a conventional stabilizer channel is shown in block form at 22. The input signal to the amplifier is applied at terminal 20, and the output signal taken from terminal 40. Tube V–1 is part of a conventional differential amplifier stage which receives the input signal on one grid and a low frequency, or drift correction signal on its other grid. The output signal from one plate of V–1 is amplified by two inverting direct-coupled amplifier stages which include tubes V–2 and V–3, and the signal on the plate of V–3 is further amplified by a power amplifier comprising tubes V–4 and V–5 in series, to provide the amplifier output signal at terminal 40. Operation of the two-tube power amplifier stage is well known, and described on pp. 456–458 of "Vacuum Tube Amplifiers" by Valley and Wallman, McGraw-Hill, New York (1948). The conventional stabilizer amplifier channel includes a modulator, a plurality of drift-free AC-coupled amplifier stages, a demodulator, and a filter, all of which are shown in block form in FIG. 2. The output signal from the stabilizer channel is applied to one grid of tube V–1 of the main amplifier channel to compensate for drift, and to amplify very slow changes in the input signal. As is well known, such amplifiers are connected with a feedback resistance (not shown) between terminals 40 and 20 when they are intended to sum a plurality of input signals, or instead, connected with a feedback capacitor (not shown) between terminals 40 and 20 when they are intended to integrate their resultant input signal with respect to time.

An operational amplifier functions to provide a feedback current to its summing junction (terminal 20) which is equal in magnitude and opposite in sense to the input current applied to the summing junction through the input scaling resistors connected to the summing junction, and because of the high loop gain provided in such amplifiers, the summing junction of a properly-operating operational amplifier is maintained substantially at ground potential; and during such conditions the stabilizing voltage fed from the stabilizer to V–1 is very small. If, however, the operational amplifier is overloaded, so that it becomes incapable of supplying a feedback current sufficient to cancel out the input current, the output voltage from the stabilizer channel will rise to an appreciable value. In the prior art, the presence of a much larger than normal voltage at the stabilizer channel output terminals has been used to signal the occurrence of an overload condition, by illuminating an indicator lamp associated with the amplifier, and sometimes by energizing a relay which in turn energized a "hold" bus, switching the computer integrators to their "hold" mode. In contrast, the overload signal, in accordance with the present invention, is not derived from the stabilizer channel, but instead from the main amplifier channel. Because stabilizer channels include modulators and demodulators they necessarily require a filter, and the presence of a filter provides a very undesirable time delay between the time an overload occurs and the time in which a measurable signal appears at the stabilizer output terminals. By deriving the overload signal from the main computing amplifier, overload signals in the present invention become available as soon as an overload occurs, providing a signal soon enough that additional amplifiers can be prevented from overloading.

As shown in FIG. 2, the overload signal may be derived from an intermediate stage of the main amplifier channel. In FIG. 2 the overload signal is derived from the plate of tube V–3, the second inverting stage of the main channel of the amplifier. Because the tube V–3 is coupled to summing junction 20 without any intervening low-pass filters, the plate of tube V–3 swings widely from its normal voltage with no appreciable time delay as soon as the amplifier is overloaded. As will be apparent to those skilled in the art from the voltages shown, the amplifier of FIG. 2 is intended to operate over a range of several hundred volts, in a so-called "100-volt" computer. During normal operation, prior to an overload, the plate of tube V–3 swings perhaps ±15 volts maximum during normal operation. When a typical overload occurs, however, the plate of V–3 will immediately swing to a voltage much greater than ±15 volts, of the order of 80 or 90 volts with V–3 being driven into saturation, due to the large gain in the preceding amplifier stages. It will be seen that the unbalance which an overload causes at summing junction 20 will be amplified substantially immediately in accordance with the open loop gains of tubes V–2 and V–3 (and more slowly in accordance with the stabilizer channel gain also), resulting in a relatively violent rapid excursion at the plate of V–3, so that overload indicator lamp NE–1 will be illuminated immediately, and more importantly, so that an overload signal will be applied immediately and positively to error-detecting circuit 25.

The V–3 plate voltage is directly connected as shown via resistor R–21 to illuminate neon lamp NE–1, which will occur whenever approximately 60 volts (plus or minus) is applied to the lamp. The V–3 plate voltage is alos routed to the detecting circuit 25 shown in FIG. 2, to provide an overload control signal on line 12, to provide automatic computer control in the specific manners described below. Overload indicator NE–1 will illuminate at approximately 60 volts irrespective of whether the plate of V–3 has swung positive or negative. It is desirable in order to simplify computer logic, that a given polarity overload signal be derived irrespective of whether the overload was caused by a positive or negative swing at the plate of tube V–3.

The V–3 plate voltage is connected via resistor R–1 to neon tube NE–2, which may comprise a conventional type NE–2 neon tube. The other terminal of neon tube NE–2 is connected to a pair of oppositely-poled diodes X–1 and X–2. If the V–3 plate swings either positively or negatively by more than about 60 volts, tube NE–2 will conduct. If the V–3 plate has swing in the negative direction, diode X–1 will conduct, providing a signal on line 14. Each operational amplifier in computer C is similarly connected to line 13 and 14, the apparatus for connecting one further amplifier being shown as including resistor R–11 and neon tube NE–12 in FIG. 2. The overload signals on lines 13 and 14 are applied through amplifiers U–11 and U–12 to a conventional OR gate G–11. Amplifier U–11 is shown as comprising an inverting amplifier while amplifier U–12 is not. Thus even though different polarity overload signals operate the two amplifiers, they both provide an overload signal of a given polarity. If either amplifier provides an input signal to gate G–11, or if both amplifiers provide such signals, an overload signal immediately results on line 12. Gate G–11 is an inclusive (rather than exclusive) OR gate.

While the invention is illustrated herein in connection with a computer utilizing vacuum-tube operational amplifiers, it will be apparent to those skilled in the art that the invention is applicable as well to computers utilizing solid-state or part solid-state, part vacuum-tube operational amplifiers.

Since the output voltage from the stabilizer channel depends upon the voltage at the amplifier summing junction 20, it will be seen that prior art overload signals have been obtained by sensing the summing junction voltage and generating an overload signal by means of the stabilizer channel. Because the stabilizer channel requires low-pass filtering with its demodulator, the time-constant of the demodulator, the time-constant of the demodulator filter has caused an appreciable time-lag between the occurrence of an overload and the production of an overload signal. In accordance with the present invention, the overload signal is not taken from the summing junction, but from within the main amplifier channel after one or more (and preferably more) stages of amplification. In accordance with the invention, the overload signal may be taken from the output of any amplifying stage of the amplifier (other than the last stage) having voltage gain substantially greater than unity; but in practice there should seldom be any reason for sensing overloads other than from the output of the stage immediately preceding the last stage of the amplifier having voltage gain greater than unity. For example, one could take the overload signal from the plate of V–2, rather than the plate of V–3, but then the overload signal excursions would be diminished by the amount of the open-loop gain of the V–3 stage. Furthermore, for sake of simplicity, it is desirable that the plate of the stage from which the overload signal is taken have a normal operating potential very near ground level, so that indicating lamp NE 1 may be connected directly to ground (and still illuminate at approximately equal voltage swings in either direction), and in order that the input circuit detecting circuit 25 need not be biased from ground by the amount of the normal plate potential of the tube from which the overload signal is taken. In the amplifier of FIG. 2 the plate of V–2 has a normal operating voltage of approximately +120 volts, and thus NE–1 would have to be returned to a +120 volt tap on the power supply if the overload signal were taken from V–2 instead of V–3, and in addition, a 120-volt bias would have to be routed to detector circuit 25.

It should be apparent at this point that the overload signal may not be taken from the output terminal 40 of the last stage of the amplifier, since unlike the previous stages, the output voltage level of the last stage depends largely upon the value of the input signal, so that large voltage excursions at terminal 40 may be due to large input signal excursions rather than being caused by an overload condition. Inasmuch as most operational amplifiers use three stages having voltage gain (such as three grounded cathode amplifiers which also invert), it will be usual to take the output signal from the plate of the second such stage, as shown in FIG. 2. Rather than obtaining the overload signal from one of the presently-used stages of the main computing amplifier, it will be seen that a special extra stage (or stages) could be provided with each amplifier, with the input circuit of the extra stage connected to the main computing amplifier summing junction and with the output circuit of the extra stage connected solely to provide the overload signal and not to feed later stages of the main computing amplifier. Such an arrangement, however, will be seen to be wasteful when compared to the arrangement shown in FIG. 2, since it requires additional amplifier stages.

Upon the occurrence of an overload condition in any operational amplifier of the computer, an output signal on line 12 is applied as shown in FIG. 1 from conventional Schmitt triger 26 via the "set" input line on flip-flop F–1 to switch flip-flop F–1, which may comprise a conventional Eccles-Jordan flip-flop, to its "set" condition. The positive, or logic "1" output signal of flip-flop F–1 is applied via a conventional 2-input "OR" gate G–5, and a conventional 2-input "OR" gate followed by an inverter (NOR gate G–4) to energize line R2 with a logic "1" signal. Unless "operate" push-button PB–2 is being depressed, inverter G–6 applies a logic "O" or negative voltage to NOR gate G–3 (and to the "clear" input line of flip-flop F–1), thereby resulting in a positive or "1" voltage on line R1. Simultaneous logic 1 voltage on lines R1 and R2 result in integrator I–1, and all other integrator circuits of the computer, being switched to their "hold" mode.

A single electronic integrator of the computer is shown within dashed lines at I–1 in FIG. 1, and it will be understood that in any problems a number of similar integrators will be provided, each controlled by lines R1 and R2. The input signals to be summed and integrated with respect to time by integrator I–1 are shown applied via terminals 41 and 42 via respective scaling resistors, and the output voltage from the integrator is taken from terminal 60. Integrator I–1 will be seen to include an operational amplifier A, which may take the form of the dual-channel operational amplifier shown in FIG. 2, and a computing capacitor C. The modes of operation of integrator I–1 are controlled by control of switches S–1 and S–2, which preferably comprise high-speed electronic switches, such as the type shown in application Ser. No. 374,341 filed June 11, 1964 by Elmer G. Gilbert. Each of the switches shown diagrammatically is an SPST type. When a logic "1" voltage (which has been chosen to be a relatively positive voltage) is present on line R1, switch S–1 is closed, connecting the junction between resistors R–41 and R–42 to the integrator summing junction 20*a*, and when a logic "O" voltage (a relatively minus voltage) is present on line R1, switch S–1 is open. Similarly, a logic "1" voltage on line R2 results in switch S–2 being closed, connecting the input signals from terminals 41, 42 (and further like terminals in many problems) to summing junction 20*a*, and with a logic "O" on line R2 switch S–2 is open.

Integrator I–1 has three distinct modes of operation: "Operate," "Hold" and "Initial Condition" (sometimes called "Reset"). In the "Operate" mode, switch S–1 is open and switch S–2 is closed. The input voltages applied via terminals 41 and 42 are integrated with respect to time to provide an integral voltage at terminal 60. The connection of resistors R–42 and R–41 to the IC terminal merely act as a small load and do not measurably affect the output voltage on terminal 60. In the "Hold" mode, both switches S–1 and S–2 are open, and the integrator output voltage remains at the value it had when the integrator was switched to the "hold" mode. In the "Initial Condition" mode, switch S–1 is closed and switch S–2 is open, and as soon as the integrator is switched to such a mode, the "initial condition" voltage at terminal IC is applied to the summing junction 20*a* via resistor R–41, and the connection of feedback resistor R–42 to the summing junction connects the integrator somewhat like a summing amplifier, so that the output voltage at terminal 60 is rapidly forced to the level of whatever initial condition voltage is applied at terminal IC. All problems require that a constant of integration (which may be zero) be set into each integrator before a computation cycle begins, and the "initial condition" mode fulfills that requirement.

Integrator I–1 is shown provided with an advantageous feature not found in integrators of the prior art, a tracking capability which allows the integrator to closely track, without appreciable time lag, a varying voltage applied to the IC terminal. Such a tracking capability is provided by connecting capacitor C–2 as shown. In prior art integrators wherein no capacitor such as C–2 was provided, the output voltage at terminal 60 would follow an input voltage applied at terminal IC only with an appreciable time lag, and if a varying voltage were applied at terminal IC, switching the integrator from "initial condition" to "operate" would begin integration from an initial condition value which was present some time prior to the instant of switching rather than that present at the instant of switching. The effect of adding capacitor C–2 may be understood by considering the well-known basic equation of a feedback amplifier.

$$e_o = \frac{Z_f}{Z_i} e_{in}$$

During the "initial condition" mode it will be seen that $Z_f$, the feedback impedance, includes R–42 and C in parallel, and thus is a complex quantity. If the input impedance $Z_f$ is also made to be a complex quantity having the same transfer function as the feedback impedance, it will be seen that the reactive components will cancel out, so that the output voltage $e_o$ will follow the input voltage $e_{in}$ with no time lag. Thus capacitor C–2 is connected in parallel with R–41 to provide an input impedance having the same (or substantially the same) transfer functions as R–42 and C in parallel. Then the integrator will track without appreciable time lag whatever voltage is applied to terminal IC during the "initial condition" mode, and for that reason the initial condition mode is sometimes also called the "track" mode. The invention is applicable, however, to old-style integrators which can track only with a time-lag as well as to the improved integrator shown in FIG. 1.

As well as the three types of mode control described above, some modern integrators also incorporate additional switching circuits (not shown) which allow different values of computing capacitors to be substituted into the integrator. By providing a plurality of IC circuits, different sets of initial conditions also may be selected by switching. Such additional switching circuits are not shown herein since they form no part of the present invention.

The operation of the mode control circuit of FIG. 1 may be explained in connection with the following truth table:

| Mode | R1 | S–1 | R2 | S–2 | X | Y |
|---|---|---|---|---|---|---|
| Operate | 0 | Open | 1 | Closed | 1 | 0 |
| Hold | 0 | do | 0 | Open | 1 | 1 |
| IC or Track | 1 | Closed | 0 | do | 0 | 0 |
| Do | 1 | do | 0 | do | 0 | 1 |

It may be noted that S–1 and S–2 are normally not closed at the same time.

When "Operate" push-button PB–2 is pressed, it applies a positive or logic "1" voltage through the non-inverting output of gate G–6 via line X, through NOR gate G–3, thereby providing a logic "O" voltage on line R–1, so that switch S–1 will be open. The inverted, or "O" output from gate G–S does not activate the "clear" line of flip-flop F–1. The logic "O" voltage on line R1 is also applied via NOR gate G–4, providing a logic "1" voltage on line R2, thereby resulting in closure of switch S–2. As previously described, opening switch S–1 and closing switch S–2 puts the integrator into its "Operate" mode.

If then, while the computer is in its "Operate" mode, one of its amplifiers overloads, flip-flop F–1 will immediately apply a logic "1" voltage through OR gate G–5, the Y line, and through NOR gate G–4, thereby providing a logic O voltage on line R2 and opening switch S–2. With both switches S–1 and S–2 open, it will be seen that the integrator will be in its "Hold" mode. If, while the computer is operating in its "Operate" mode, "Hold" push-button PB–1 is depressed, it instead of flip-flop F–1 will apply a logic 1 to gate G–5, switching the integrator to "Hold" in the same manner.

As shown in FIG. 1, lines R1 and R2 are similarly connected to all of the integrators of the computer, and hence an overload in any amplifier will automatically and immediately put all computer integrators into their "Hold" mode, thereby preventing further amplifiers from being driven into overload. As soon as the fault is found and removed, the overload light (NE–1 of FIG. 2) associated with the overloaded amplifier will be extinguished, and then by closing "Operate" push-button PB–2, the computation may proceed further through the problem. If the same or another amplifier should begin to overload further in the problem, the computer will be switched again into "Hold" until the fault is corrected.

As well as the two above-mentioned push-buttons, the computer is provided with an "Initial Condition" or "IC" push-button PB–3. All three of the push-buttons are interlocked, so that only one may be closed at a time. All three push-buttons may comprise mechanically-interlocked latching push-buttons, but preferably the circuit will utilize the momentary push-buttons and interlocked relays of the system in application Ser. No. 363,337 filed April 22, 1964 by Edward O. Gilbert now Patent No. 3,311,795 issued March 28, 1967. As shown in FIG. 1 the initial condition push-button need not be electrically connected. Operation of "IC" push-button PB–3 will open push-buttons PB–1 and PB–2, resulting in switch S–1 being closed and switch S–2 being open, thereby causing the integrator to reset to the initial condition voltage level being applied at terminal IC. Then when "Operate" push-button PB–2 is later depressed, the computer will start again through the problem.

Figure 1A:
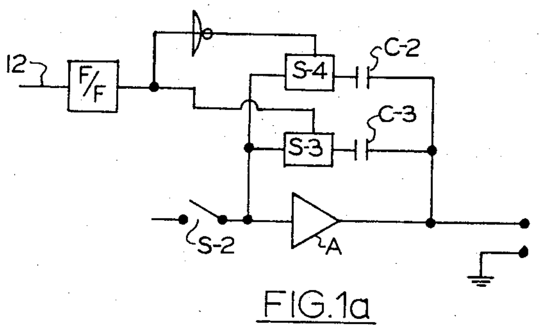

As well as including switches which perform the mode control functions of switches S–1 and S–2 of FIG. 1, many electronic integrators contain additional switches (not shown) which determine the amplifier feedback impedance. FIG. 1*a* shows a modified circuit in which the integrator time-constant is determined by whether capacitor C–2 or capacitor C–3 is connected in its feedback circuit. When flip-flop F/F is in one state, one of electronic switches S–3, S–4 is closed and the other is open, selecting one of the two capacitors, and upon occurrence of an overload signal on line 12, flip-flop F/F is switched, thereby selecting the other capacitor. It will be appreciated that many integrators will utilize both the electronic switches S–1 and S–2 of FIG. 1 and the electronic switches S–3 and S–4 of FIG. 1*a*.

Figure 3:
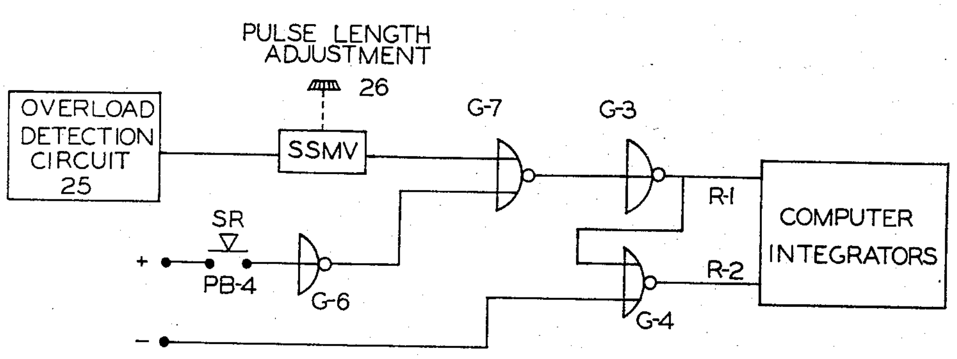
FIG. 3 is an electrical schematic diagram illustrating a modified form of the invention.

The computer control arrangement illustrated by means of FIG. 3 provides a new and very desirable mode of computer operation in which the computer repetitively goes through solutions in which the cycle time is determined by the occurrence of an overload signal. In FIG. 3 the overload detecting circuit 25 is connected to operate a conventional single-shot multivibrator SSMV upon the occurrence of an overload. Operation of the single-shot provides a signal which switches all of the computer integrators to their "initial condition" mode for a predetermined time period governed by the length of the output pulse provided by the single-shot, and upon the cessation of the pulse, the integrators are switched back to their "operate" mode, so that the computer begins computing again from the original initial conditions. The length of the reset pulse from the single-shot multivibrator determines the length of time after an overload that the computer integrators are all switched to their "initial condition" mode. The multivibrator is preferably made adjustable (as indicated by control knob 26) so that its pulse length may be selected in accordance with the reset time-constants of the integrators. Some types of integrators require a greater time to reset to initial conditions than others. If relatively-slowly re-setting integrators are used, the SSMV pulse length may be selected to be ten times, for example the integrator time constant, while a pulse length only two or three times the integrator time-constant is sufficient for other types of integrators and in some applications.

To provide repetitive operation with the length of the computing cycle determined by an overload in accordance with FIG. 3, latching push-button PB–4, labelled "Start Repetitive" is depressed, providing a negative output from NOR gate G–6, a positive output from NOR gate G–7, and a negative output from NOR gate G–3 on line R1, thereby resulting in switch S–1 of each integrator being open. The negative signal on R1 provides a positive output from NOR gate G–4 on line R2, thereby resulting in switch S–2 in each integrator being closed. With its switch S–1 open and its switch S–2 closed, each integrator will be in its "operate" mode, as shown by the truth table shown above. Thus the computer will begin to progress through all or part of a solution. When an overload occurs, overload detecting circuit 25 will immediately operate pulser SSMV, providing a positive pulse of determined length to NOR gate G–7, so that a negative pulse of known length will be provided to NOR gate G–3, providing a positive pulse on line R1 which maintains switch S–1 closed for the length of the pulse. The positive output on line R1 provides a negative output from gate G–4 on line R2 for the length of the pulse, thereby opening switch R–2 for the duration of the pulse. As shown by the truth table, closure of switch S–1 and opening of switch S–2 puts each integrator into its "initial condition" mode for the time of the pulse. At the end of the pulse from pulser SSMV, switch S–1 will open again and switch S–2 will close again in each integrator, returning all of the computer integrators to their "operate" mode, so that the computer will begin anew to progress from the selected initial conditions through a solution of the problem. Unless some adjustments are made, the computer will continue to reset over and over each time it reaches the same point in the problem solution, but if proper adjustments are made, the computer then will progress further through the problem. Because the integrators are thrown into their reset mode a few microseconds after an overload occurs in any computer amplifier, no computer amplifier is driven heavily into overload.

Figure 4:
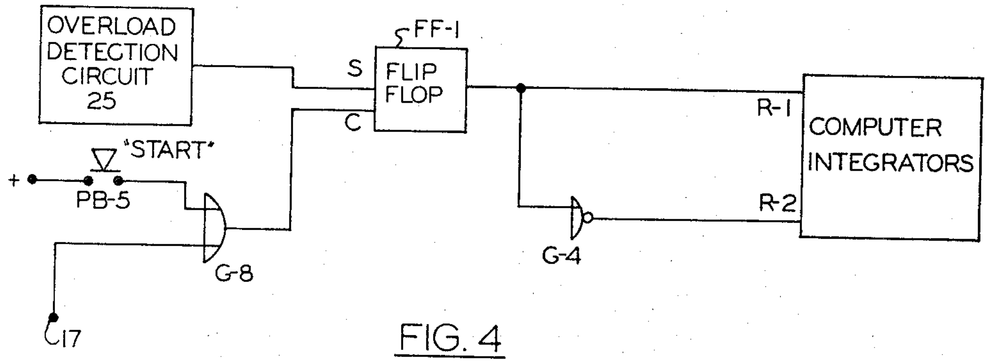
FIG. 4 is an electrical schematic diagram illustrating yet another embodiment of the invention.

The apparatus illustrated by means of FIG. 4 has the overload circuit arranged to switch all of the computer integrators into their "initial condition" mode upon the occurrence of an overload, and then to maintain the computer in such a mode until an external signal is received. The external signal may be derived from a digital computer, or from a plant or process condition which indicates that the computer "operate" mode may be resumed.

When either a "start" signal obtained by depression of start push-button PB–5 or an external signal of logic "1" is received at terminal 17, an output signal is applied from OR gate G–8 to the "reset" or "clear" input line of flip-flop FF–1, thereby providing a negative output on line R1 to maintain switch S–1 open. The negative output on line R1 provides a positive output on line R2, closing switch S–2, so that the computer integrators are all in their "operate" mode. Upon the occurrence of an overload, detector circuit 25 operates to set flip-flop FF–1, operating to provide a positive output on line R1 and a negative output on line R2, thereby swiching all of the computer integrators to their "initial condition" modes. The computer then remains in such a mode either until the start push-button is depressed again, or until an input signal from an external source applied to terminal 17 operates to clear flip-flop FF–1.

While the invention has been disclosed principally in connection with the provision of a rapidly-acting overload signal to provide "automatic hold" (FIG. 1), "automatic reset" (FIG. 4), and to determine the limit of a repetitive cycle (FIG. 3), it should be clearly understood that overload signals derived in accordance with the present invention may be used in numerous diverse manners for other types of computer mode or logic switching. For example, in so-called hybrid applications which involve the use of interconnected analog computer apparatus and digital computer apparatus, the overload signal may be used to switch the digital computer to a mode which effects automatic re-scaling of the analog computer, thereby curing the overload condition. Also in such hybrid arrangements the overload signal may be used to switch the digital computer or an analog-to-digital converter so that erroneous analog data which would be fed to the digital computer memory from the analog computer through the A/D converter either will not be transmitted, or if transmitted will not be stored or processed.

While the embodiments disclosed in detail above each switch the computer mode upon the occurrence of an overload in *any* one (or more) of the operational amplifiers, it should be clearly understood that in some embodiments of the invention two or more such overload systems may be provided, with one group of the operational amplifiers connected to operate one such system and another group connected to operate another overload system. In such arrangements, the amplifiers of one group may be intentionally scaled so that they will overload when a certain variable or group of variables reach a predetermined point or points in the problem solution, and upon occurrence of such an overload switches may be operated to control the manner in which the amplifiers of the other group proceed further through the problem solution. By computing a quantity which will reach zero at a certain point in the solution of a problem and feeding the quantity as a divisor into a conventional dividing circuit, an amplifier will overload as the circuit attempts to divide by zero.

While the embodiments disclosed in detail above each include the connection of plurality amplifiers through an "OR" circuit to activate an overload signal bus, those skilled in the art will recognize that in some embodiments it may be desirable to route the overload signals from two or more amplifiers through an "AND" circuit, to activate an overload bus only when both amplifiers are overloaded. Such arrangements will be particularly useful to switch computer modes when two or more computer variables reach predetermined limits. Furthermore, the overload signals derived as shown from operational amplifiers may be combined (as by means of OR or AND circuits, for example) with overload signals derived from other analog computer circuits such as electronic "quarter-squares" multipliers, function generators, (such as logarithm and sine-cosine), servo-positioned potentiometers, and from various process variables when the computer is interconnected to an actual plant or process.

In the specific embodiments described, the use of the specially-derived amplifier overload signal to reset electronic integrators is shown, and it should be recognized that such overload signals may also be used to reset servo integrators, and to control position servos to drive them to selected positions. The proper placement of a switch in such a servo so that the overload signal will properly reset or re-position the servo will be readily apparent to those skilled in the art.

While the invention has been particularly described in connection with usual operational amplifiers having three (or some other odd number of) direct-coupled signal-inverting stages, it will be understood that non-inverting cathode-followers, or the like, may be inserted between the signal-inverting stages without departing from the invention, and that in the claims below, the use of the terms "direct-coupled" and "cascaded" is not meant to preclude the use of such additional intermediate stages. Each operational amplifier will have an odd number of inverting stages between the signal input to its first stage and the output terminal of its last stage, but any number of non-inverting buffer stages or the like may be inserted between such stages, as is well known to those skilled in the art.

It will thus be seen that the objects set forth above, among those made apparent from the preceding description, are efficiently attained, and since certain changes may be made in the above constructions without departing from the scope of the invention, it is intended that all matter contained or shown in the accompanying drawings shall be interpreted as illustrative and not in a limiting sense.

Having described my invention, what we claim as new and desire to secure by Letters Patent is:

1. Analog computer apparatus, comprising, in combination: a plurality of operational amplifiers, each of said operational amplifiers including a plurality of cascaded amplifying stages which are direct-coupled to each other, a summing junction terminal connected to the input circuit of the first of said stages, and a feedback impedance connected between the output terminal of the last of said stages and said summing junction terminal; said feedback impedance in at least one of said operational amplifiers comprising a capacitor, thereby causing said one operational amplifier to comprise an electronic integrator circuit, said electronic integrator circuit also including switching means for switching said electronic integrator circuit between different operating modes; first circuit means associated with at least one of said operational amplifiers for connecting the output signal from a stage of said at least one amplifier intermediate its first and last stages to an overload signal terminal; and second circuit means connecting said overload signal terminal to said switching means.

2. Apparatus according to claim 1 in which said at least one operational amplifier includes a stabilizer channel having modulator means, further amplifier means and demodulator means.

3. Analog computer apparatus, comprising, in combination: a first group of operational amplifiers provided with resistive feedback impedances; a second group of operational amplifiers provided with capacitive feedback impedances and switching means for controlling the mode of operation of said amplifiers of said second group, each of said operational amplifiers of said first and second groups including three cascaded high-frequency signal-inverting amplifying stages having gains greater than unity; first circuit means connected between the output circuit of a selected stage other than the last stage of various of said operational amplifiers and a control terminal; and second circuit means connecting the signal at said control terminal to control said switching means.

4. Apparatus according to claim 3 in which the output circuit of the selected stage of each of said operational amplifiers lies substantially at a reference potential during normal operation of said operational amplifiers, and in which each of said operational amplifiers includes voltage-sensitive indicating means connected between its respective output circuit and said reference potential.

5. Apparatus according to claim 3 in which said switching means associated with each operational amplifier of said second group comprises first and second SPST switches, said first switch being operable upon closure to apply input signals to its associated operational amplifier, said second switch being operable upon closure to cause the output voltage of its associated operational amplifier to assume a reference level, and in which said signal at said control terminal is operative to open both of said switches.

6. Apparatus according to claim 5 having manually-operable second switching means operable to close said first switch and to open said second switch, and manually-operable third switching means operable to open both of said switches.

7. Apparatus according to claim 3 in which said first circuit means comprises a plurality of voltage-sensitive means each responsive to the signal level at the output circuit of said selected stage of a respective one of said operational amplifiers for applying a further signal to a further terminal when said signal level exceeds a selected magnitude, said further signal having a polarity in accordance with the polarity of said signal level, first means for combining the further signals of one polarity on a first line, second means for combining the further signals of the other polarity on a second line, and means connecting said first and second lines to said control terminal to control said switching means.

8. Analog computer apparatus, comprising, in combination: a first group of operational amplifiers provided with resistive feedback impedances; a second group of operational amplifiers provided with capacitive feedback impedances and switching means, each of said operational amplifiers of said first and second groups comprising cascaded first and second high-frequency amplifier means each having an input circuit and an output circuit, with the output circuit of the first amplifier means being direct-coupled to the input circuit of the second amplifier means and with the feedback impedance of each of said operational amplifiers being connected between the output circuit of its respective second amplifier means and the input circuit of its respective first amplifier means; first circuit means connected between the output circuit of the first amplifier means of each of said operational amplifiers and a control terminal; and second circuit means connecting the signal at said control terminal to control said switching means.

9. Apparatus according to claim 8 in which at least one of said operational amplifiers also includes a stabilizer amplifier channel comprising cascaded modulator means, AC-coupled amplifier means and demodulator means, said modulator means having an input circuit connected to the input circuit of said first high-frequency amplifier means, and further circuit means connecting the output circuit of said demodulator means to a stage within said first high-frequency amplifier means.

10. Apparatus according to claim 8 in which said first circuit means includes a gating circuit.

11. Apparatus according to claim 8 in which said first circuit means of each of said operational amplifiers is adapted to provide an overload signal upon the occurrence of an overload condition occurring in its associated operational amplifier.

12. Apparatus according to claim 9 in which the occurrence of an overload signal at any of said operational amplifiers is operative to control said switching means to disconnect at least one input signal from at least one of said operational amplifiers of said second group.

13. Apparatus according to claim 9 in which the occurrence of an overload signal at any of said operational amplifiers is operative to control said switching means to switch said operational amplifiers of said second group to a reset condition.

14. An electronic computer circuit, comprising, in combination: an operational amplifier having a plurality of high-frequency amplifier stages each having input and output circuits, a summing junction terminal connected to an input circuit of a first of said stages, further ones of said stages being direct-coupled between the output circuit of said first stage and an amplifier output terminal at the output circuit of a last of said stages, and a feedback impedance connected between said output terminal at the last of said stages and said summing junction terminal; electronic computer apparatus connected to apply an input signal to said input circuit and connected to receive an output signal from said output terminal, said electronic computer apparatus including at least one electronic switch; and circuit means connected to apply the output signal from one of said stages other than said last stage to control the operation of said electronic switch.

15. A circuit according to claim 14 in which said operational amplifier includes three signal-inverting stages and in which said circuit means is connected to apply the output signal from the second of said three signal-inverting stages to control said electronic switch.

16. A circuit according to claim 14 in which said circuit means comprises first and second circuit branches having respectively oppositely-poled unidirectional conducting means and means in one circuit branch for inverting the signal in said one circuit branch, thereby to provide an output signal of a given polarity to control said electronic switch, irrespective of the polarity of the output signal from the said one of said stages.

17. Apparatus according to claim 14 in which the input circuit of a further one of said stages is connected to said summing junction terminal, and in which said circuit means is connected to the output circuit of said further one of said stages.

References Cited

UNITED STATES PATENTS

| | | | |
|---|---|---|---|
| 2,750,110 | 6/1956 | Och | 235—183 |
| 3,264,456 | 8/1966 | Gruet | 235—183 |

MALCOLM A. MORRISON, *Primary Examiner.*

J. F. RUGGIERO, *Assistant Examiner.*